United States Patent
Pasley et al.

(10) Patent No.: US 12,411,598 B2
(45) Date of Patent: Sep. 9, 2025

(54) INTERACTION EVENTS BASED ON PHYSIOLOGICAL RESPONSE TO ILLUMINATION

(71) Applicant: APPLE INC., Cupertino, CA (US)

(72) Inventors: Brian Pasley, Berkeley, CA (US); Grant H. Mulliken, Los Gatos, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 18/693,397

(22) PCT Filed: Sep. 20, 2022

(86) PCT No.: PCT/US2022/044061
§ 371 (c)(1),
(2) Date: Mar. 19, 2024

(87) PCT Pub. No.: WO2023/049089
PCT Pub. Date: Mar. 30, 2023

(65) Prior Publication Data
US 2025/0130709 A1 Apr. 24, 2025

Related U.S. Application Data

(60) Provisional application No. 63/247,827, filed on Sep. 24, 2021.

(51) Int. Cl.
*G06F 3/0487* (2013.01)
*G06F 3/01* (2006.01)

(52) U.S. Cl.
CPC ............ *G06F 3/0487* (2013.01); *G06F 3/013* (2013.01); *G06F 3/015* (2013.01)

(58) Field of Classification Search
CPC ...... G06F 3/013; G06F 3/04842; G06F 3/015; G06F 3/017; G06F 3/011; G06F 3/012; G06F 3/04817; G06F 3/0482
See application file for complete search history.

(56) References Cited

U.S. PATENT DOCUMENTS

| | | |
|---|---|---|
| 8,824,779 B1 | 9/2014 | Smyth |
| 8,911,087 B2 | 12/2014 | Publicover |

(Continued)

FOREIGN PATENT DOCUMENTS

| | | |
|---|---|---|
| CN | 102402579 A | 4/2012 |
| CN | 103748599 A | 4/2014 |

(Continued)

OTHER PUBLICATIONS

European Patent Office (ISA/EP), International Search Report and Written Opinion of the International Searching Authority, International Application No. PCT/US2022/044061, 14 pages Jan. 9, 2023.

*Primary Examiner* — Koosha Sharifi-Tafreshi
(74) *Attorney, Agent, or Firm* — Thompson Hine LLP

(57) ABSTRACT

Various implementations disclosed herein include devices, systems, and methods that determine an interaction event during presentation of an interaction element. For example, an example process may include obtaining physiological data associated with a pupil during presentation of an interaction element, determining, based on the obtained physiological data, a pupillary response during the presentation of the interaction element, determining that the pupillary response corresponds to attention response characteristics associated with attention of a region of the regions of the interaction element based on the different illumination characteristics of the regions, and determining an interaction event during the presentation of the interaction element based on determining that the pupillary response corresponds to directing attention to the region during the presentation of the interaction element.

20 Claims, 8 Drawing Sheets

(56) References Cited

U.S. PATENT DOCUMENTS

| | | |
|---|---|---|
| 8,994,613 B1 | 3/2015 | Johnson |
| 9,123,050 B2 | 9/2015 | Ryu |
| 9,569,734 B2 | 2/2017 | Thieberger |
| 9,588,992 B2 | 3/2017 | Filman |
| 9,596,508 B2 | 3/2017 | Mccoy |
| 9,600,069 B2 | 3/2017 | Publicover |
| 9,805,131 B2 | 10/2017 | Cypher |
| 9,823,744 B2 | 11/2017 | Publicover |
| 9,910,927 B2 | 3/2018 | Cypher |
| 9,931,069 B2 | 4/2018 | Publicover |
| 9,990,438 B2 | 6/2018 | Cypher |
| 10,083,243 B2 | 9/2018 | Cypher |
| 10,134,048 B2 | 11/2018 | Deephanphongs |
| 10,134,084 B1 | 11/2018 | Gabriele |
| 10,156,900 B2 | 12/2018 | Publicover |
| 10,311,161 B2 | 6/2019 | Cypher |
| 10,325,144 B2 | 6/2019 | Zhang |
| 10,346,860 B2 | 7/2019 | Deephanphongs |
| 10,366,174 B2 | 7/2019 | Cypher |
| 10,620,700 B2 | 4/2020 | Publicover |
| 10,664,543 B2 | 5/2020 | Cypher |
| 10,706,117 B2 | 7/2020 | Cypher |
| 10,820,850 B2 | 11/2020 | Publicover |
| 10,884,577 B2 | 1/2021 | Palti-Wasserman |
| 11,119,573 B2 | 9/2021 | Bar-Zeev |
| 2006/0093998 A1 | 5/2006 | Vertegaal |
| 2010/0179857 A1 | 7/2010 | Kalaboukis |
| 2012/0084731 A1 | 4/2012 | Filman |
| 2012/0293773 A1 | 11/2012 | Publicover |
| 2013/0022948 A1 | 1/2013 | Angell |
| 2014/0026156 A1 | 1/2014 | Deephanphongs |
| 2014/0064578 A1 | 3/2014 | Choe |
| 2014/0344017 A1 | 11/2014 | Deephanphongs |
| 2015/0213634 A1 | 7/2015 | Karmarkar |
| 2015/0262230 A1 | 9/2015 | Cypher |
| 2015/0262236 A1 | 9/2015 | Cypher |
| 2015/0262280 A1 | 9/2015 | Cypher |
| 2015/0262286 A1 | 9/2015 | Cypher |
| 2015/0262288 A1 | 9/2015 | Cypher |
| 2015/0324568 A1 | 11/2015 | Publicover |
| 2015/0326570 A1 | 11/2015 | Publicover |
| 2015/0332166 A1 | 11/2015 | Ferens |
| 2015/0338915 A1 | 11/2015 | Publicover |
| 2015/0355815 A1 * | 12/2015 | Palti-Wasserman ........................ G06F 3/04817 715/835 |
| 2016/0062459 A1 | 3/2016 | Publicover |
| 2016/0085302 A1 | 3/2016 | Publicover |
| 2016/0117407 A1 | 4/2016 | Cypher |
| 2016/0117763 A1 | 4/2016 | Cypher |
| 2016/0166190 A1 | 6/2016 | Publicover |
| 2016/0225012 A1 | 8/2016 | Ha |
| 2016/0252956 A1 | 9/2016 | Wheeler |
| 2016/0274660 A1 | 9/2016 | Publicover |
| 2016/0328015 A1 | 11/2016 | Ha |
| 2017/0235931 A1 | 8/2017 | Publicover |
| 2017/0262696 A1 | 9/2017 | Zhang |
| 2017/0278122 A1 | 9/2017 | Kaehler |
| 2017/0290504 A1 | 10/2017 | Khaderi |
| 2017/0293356 A1 | 10/2017 | Khaderi |
| 2018/0011941 A1 | 1/2018 | Cypher |
| 2018/0184958 A1 | 7/2018 | Publicover |
| 2018/0246979 A1 | 8/2018 | Cypher |
| 2018/0286070 A1 * | 10/2018 | Benedetto ................ G06T 7/62 |
| 2018/0309955 A1 * | 10/2018 | Lawrence ............. H04N 19/00 |
| 2018/0365711 A1 | 12/2018 | Deephanphongs |
| 2019/0005143 A1 | 1/2019 | Cypher |
| 2019/0108686 A1 | 4/2019 | Spivack |
| 2019/0187787 A1 | 6/2019 | White |
| 2019/0303414 A1 | 10/2019 | Cypher |
| 2019/0361943 A1 | 11/2019 | Cypher |
| 2020/0103967 A1 * | 4/2020 | Bar-Zeev ................ G06F 3/011 |
| 2021/0035298 A1 | 2/2021 | Yildiz |
| 2021/0365116 A1 | 11/2021 | Bar-Zeev |
| 2025/0060821 A1 | 2/2025 | Mulliken |

FOREIGN PATENT DOCUMENTS

| | | | |
|---|---|---|---|
| CN | 104620522 A | 5/2015 | |
| CN | 105183170 A | 12/2015 | |
| CN | 106537290 A | 3/2017 | |
| CN | 106663277 A | 5/2017 | |
| WO | WO-2020068447 A1 * | 4/2020 | ............ A61B 3/112 |
| WO | WO-2020159784 A1 * | 8/2020 | ........... A61B 3/0041 |

* cited by examiner

INTERACTION EVENTS BASED ON PHYSIOLOGICAL RESPONSE TO ILLUMINATION

CROSS-REFERENCE TO RELATED APPLICATIONS

This patent application is the national stage of International Application No. PCT/US2022/044061 (International Application No. WO 2023/049089) filed on Sep. 20, 2022, which claims the benefit of U.S. Provisional Application No. 63/247,827 filed on Sep. 24, 2021, entitled "INTERACTION EVENTS BASED ON PHYSIOLOGICAL RESPONSE TO ILLUMINATION," each of which is incorporated herein by this reference in its entirety.

TECHNICAL FIELD

The present disclosure generally relates to presenting content via electronic devices, and in particular, to systems, methods, and devices that determine an interaction event during and/or based on the presentation of electronic content and physiological data.

BACKGROUND

Determining a user's intent while viewing and/or listening to content on an electronic device can facilitate a more meaningful experience. For example, a user interface element (e.g., a selectable icon or button) may be automatically selected based on determining the user's intent to make such a selection and without the user necessarily having to perform a gesture, mouse click, or other input-device-based action to initiate the selection. Improved techniques for assessing the intent of users viewing and interacting with content may enhance the users' enjoyment, comprehension, and learning of the content. Content creators and systems may be able to provide better and more tailored user experiences based determining user intent to interact with user interface elements.

SUMMARY

Various implementations disclosed herein include devices, systems, and methods that assess physiological data (e.g., gaze characteristic(s)) and illumination characteristics of an interaction element to predict an interaction event (e.g., predicting when a user is focused on a particular portion of the content). For example, a method may identify that, during a particular segment of the experience, the user's gaze characteristics (e.g., pupil dilation vs. constriction, stable gaze direction and/or velocity) corresponds to a user focusing on a particular icon or user interface element. For example, a user may direct their attention to a bright feature in an icon or other user interface element in order to initiate a "click" or other interaction. Physiological data may be used to determine an interaction event. For example, some implementations may identify that the user's eye characteristics (e.g., blink rate, stable gaze direction, saccade amplitude/velocity, and/or pupil radius) relate to an interaction with a presentation of an interaction element (e.g., an icon) based on a user's focus upon different regions of the interaction element that have different illumination characteristics. For example, the illumination features may include relatively dark or bright regions. Additionally, determining the user's eye characteristics may involve obtaining images of the eye or electrooculography (EOG) data, microsaccades, and/or head movements, from which pupil response/gaze direction/movement can be determined.

Context may additionally be used to determine interaction events. For example, a scene analysis of an experience can determine a scene understanding of the visual and/or auditory attributes associated with content being presented to the user (e.g., what is being presented in video content) and/or attributes associated with the environment of the user (e.g., where is the user, what is the user doing, what objects are nearby). These attributes of both the presented content and environment of the user can improve the determination of the user's intent regarding an interaction event.

In some implementations, determining an interaction event may be based on a characteristic of an environment of the user (e.g., real-world physical environment, a virtual environment, or a combination of each). The device (e.g., a handheld, laptop, desktop, or head-mounted device (HMD)) provides an experience (e.g., a visual and/or auditory experience) of the real-world physical environment or an extended reality (XR) environment. The device obtains, with one or more re sensors, physiological data (e.g., electroencephalography (EEG) amplitude, pupil modulation, eye gaze saccades, head movements measured by an inertial measurement unit (IMU), etc.) associated with the user. Based on the obtained physiological data, the techniques described herein can determine an interaction event during the experience. Based on the physiological data and associated physiological response (e.g., a user focusing on a particular region of the content), the techniques can provide a response to the user based on the interaction event and adjust the content corresponding to the experience.

Physiological response data, such as EEG amplitude/frequency, pupil modulation, eye gaze saccades, etc., can depend on the individual, characteristics of the scene in front of him or her (e.g., video content), and attributes of the physical environment surrounding the user including the activity/movement of the user. Physiological response data can be obtained while using a device with eye tracking technology (and other physiologic sensors) while users perform tasks. In some implementations, physiological response data can be obtained using other sensors, such as EEG sensors or EDA sensors. Observing repeated measures of physiological response data to an experience can give insights about the intent of the user.

Several different experiences can utilize the techniques described herein regarding assessing interaction events. For example, the method can be provided to support users who want to interact with user interface elements without using hands, voice, or overt eye movements like dwell time. Additionally, determining interaction events can be used as an accessibility feature, for example, that enables paralyzed users to interact by selecting computer graphic icons using their eyes. Additionally, determining interaction events can be used in general applications (e.g., a user interface selection tool, a device wake-up signal, etc.), and might be combined with other eye or touch-based mechanisms, such as to improve signal-to-noise ratio (SNR), robustness, response time, and the like.

Some implementations focus on improving the accuracy for assessing interaction events based on a user's pupillary response by incorporating practice exercises. For example, a machine learning algorithm may be implemented to determine whether or not a user's focus means that he or she is intending to select a particular icon.

Some implementations assess physiological data and other user information to help improve a user experience. In such processes, user preferences and privacy should be respected, as examples, by ensuring the user understands and consents to the use of user data, understands what types of user data are used, has control over the collection and use of user data and limiting distribution of user data, for example, by ensuring that user data is processed locally on the user's device. Users should have the option to opt in or out with respect to whether their user data is obtained or used or to otherwise turn on and off any features that obtain or use user information. Moreover, each user should have the ability to access and otherwise find out anything that the system has collected or determined about him or her.

In general, one innovative aspect of the subject matter described in this specification can be embodied in methods, at a device including a processor, that include the actions of obtaining physiological data associated with a pupil during presentation of an interaction element, the interaction element including regions having different illumination characteristics, determining, based on the obtained physiological data, a pupillary response during the presentation of the interaction element, determining that the pupillary response corresponds to attention response characteristics associated with attention of a region of the regions of the interaction element based on the different illumination characteristics of the regions, and determining an interaction event during the presentation of the interaction element based on determining that the pupillary response corresponds to directing attention to the region during the presentation of the interaction element.

These and other embodiments can each optionally include one or more of the following features.

In some aspects, the different illumination characteristics of the regions of the interaction element includes one or more dark regions and one or more bright regions.

In some aspects, each region of the interaction element includes a level of luminance and the different illumination characteristics of the regions are based on the level of luminance of each region with respect to an illuminance threshold level.

In some aspects, the presentation of the interaction element includes pixel information for a plurality of pixels and determining that the pupillary response corresponds to directing attention to the region of the regions of the interaction element includes determining an estimated perceived luminance for each pixel in the region based on the pixel information.

In some aspects, determining an interaction event includes determining scene-induced pupil response variation characteristics for the regions of the interaction element, and determining the interaction event during the presentation of the interaction element based on the scene-induced pupil response variation characteristics for the regions of the interaction element.

In some aspects, the interaction event is classified using a machine learning technique based on the pupillary response and the different illumination characteristics of the regions.

In some aspects, the method further includes adjusting content in response to determining the interaction event.

In some aspects, the pupillary response is a direction of the pupillary response, a velocity of the pupillary response, or pupillary fixations. In some aspects, the pupillary response is derived from a saccade characteristic.

In some aspects, the physiological data includes an image of an eye or electrooculography (EOG) data. In some aspects, the physiological data includes head movements.

In some aspects, determining the pupillary response during the presentation of the interaction element is based on determining a variability of the pupillary response to a threshold.

In some aspects, the device is a head-mounted device (HMD). In some aspects, the presentation of the interaction element is an extended reality (XR) experience.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 2:
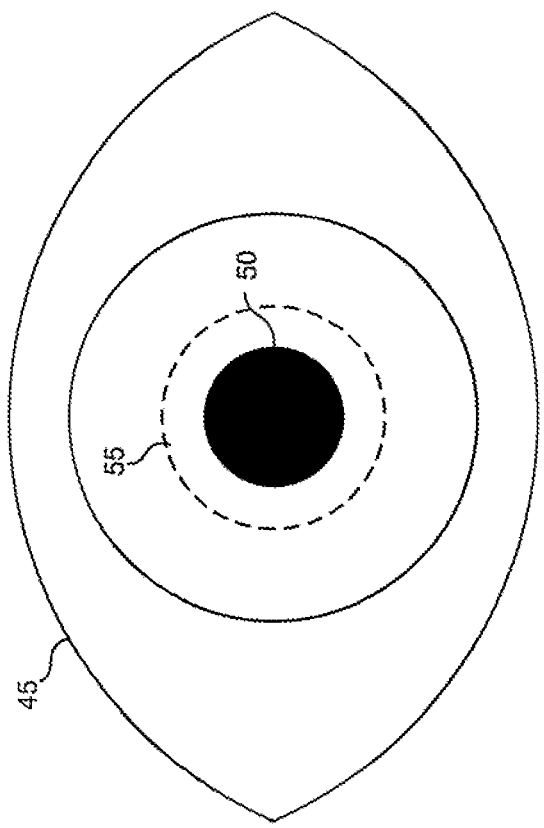
FIG. 2 illustrates a pupil of the user of FIG. 1 in which the diameter of the pupil varies with time in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Figure 1:
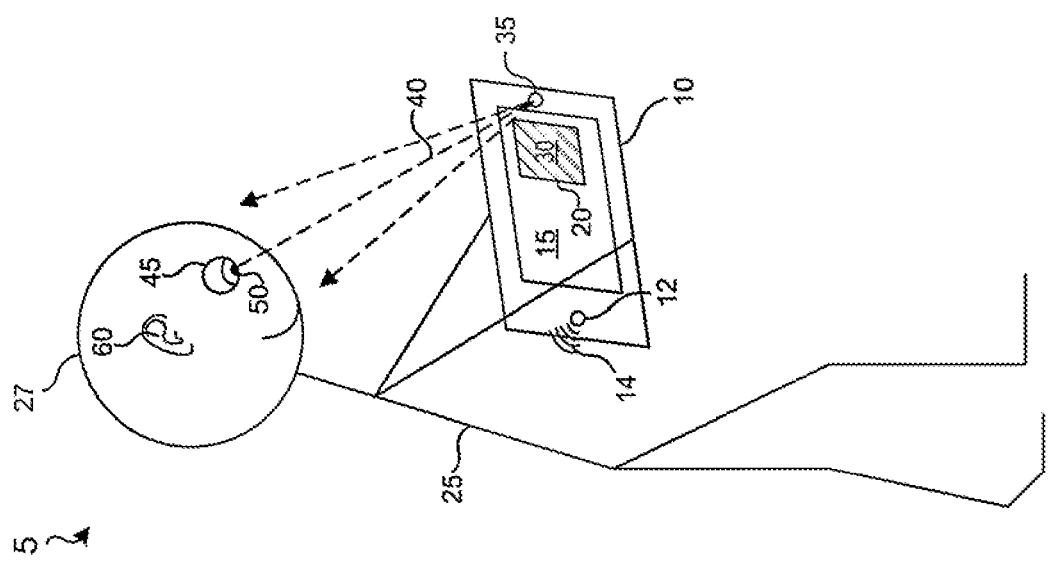
FIG. 1 illustrates a device displaying a visual and/or auditory experience and obtaining physiological data from a user in accordance with some implementations.

FIG. 1 illustrates a real-world environment 5 including a device 10 with a display 15. In some implementations, the device 10 displays content 20 to a user 25, and a visual characteristic 30 that is associated with content 20. For example, content 20 may be a button, a user interface icon, a text box, a graphic, etc. In some implementations, the visual characteristic 30 associated with content 20 includes visual characteristics such as hue, saturation, size, shape, spatial frequency, motion, highlighting, etc. For example, content 20 may be displayed with a visual characteristic 30 of green highlighting covering or surrounding content 20.

In some implementations, content 20 may be a visual experience (e.g., an education experience), and the visual characteristic 30 of the visual experience may continuously change during the visual experience. As used herein, the phrase "experience" refers to a period of time during which a user uses an electronic device and has one or more interaction events. In one example, a user has an experience in which the user perceives a real-world environment while holding, wearing, or being proximate to an electronic device that includes one or more sensors that obtain physiological data that is indicative of the user's interaction event. In another example, a user has an experience in which the user perceives content displayed by an electronic device while the same or another electronic obtains physiological data (e.g., pupil data, EEG data, head movements, etc.) to assess the user's interaction with an interaction element (e.g., a selectable icon). The physiological data may include, but is not limited to, pupil data, EEG data, head movement data, gaze speed, blink rate, raw eye images, eye-lid shape, micro saccades, eye tremor, eye drift, and the like. In another example, a user has an experience in which the user holds, wears, or is proximate to an electronic device that provides a series of audible or visual instructions that guide the experience. For example, the instructions may instruct the user to have particular interaction events during particular time segments of the experience, e.g., instructing the user to focus on his or her attention to a particular portion of the interaction element in order to further train a machine learning algorithm to better detect the user intentions of selecting the interaction element. During such an experience, the same or another electronic device may obtain physiological data to assess the user's intent to interact with the interaction element.

In some implementations, aside from looking at an actual on-screen item on the display of device 10, user 25 could be instructed to visually imagine a bright or dark mental image to induce a pupil response and initiate the intent to interact. For example, a mental image may be a rerepresentation of a perception, thus properties such as luminance or brightness should also be conjured up in the image, and the device 10 may obtain physiological data to assess the user's intent to interact with an imagined interaction element.

In some implementations, the visual characteristic 30 is a feedback mechanism for the user that is specific to the experience (e.g., a visual or audio cue to focus on a particular task during an experience, such as paying attention during a particular part of an education/learning experience). In some implementations, the visual experience (e.g., content 20) can occupy the entire display area of display 15. For example, during an experience, content 20 may be a video or sequence of images that may include visual and/or audio cues as the visual characteristic 30 presented to the user to pay attention. Other visual experiences that can be displayed for content 20 and visual and/or audio cues for the visual characteristic 30 will be further discussed herein.

In some implementations, as illustrated in FIG. 1, the device 10 is a handheld electronic device (e.g., a smartphone or a tablet). In some implementations the device 10 is a laptop computer or a desktop computer. In some implementations, the device 10 has a touchpad and, in some implementations, the device 10 has a touch-sensitive display (also known as a "touch screen" or "touch screen display"). In some implementations, the device 10 is a wearable head mounted display (HMD). While this example and other examples discussed herein illustrate a single device 10 in a real-world environment 5, the techniques disclosed herein are applicable to multiple devices and multiple sensors, as well as to other real-world environments/experiences. For example, the functions of device 10 may be performed by multiple devices.

The device 10 obtains physiological data (e.g., EEG amplitude/frequency, pupil modulation, eye gaze saccades, etc.) from the user 25 via a sensor 35 (e.g., one or more camera's facing the user to capture light intensity data and/or depth data of a user's facial features, head movements, and/or eye gaze). For example, the device 10 obtains pupillary data 40 (e.g., eye gaze characteristic data). In some implementations, head movements of the user 25 may be obtained by sensor(s) 35 as illustrated. Alternatively, head movements may be obtained by another sensor that the user 25 is wearing. For example, if the device 10 is worn on the head (e.g., an HMD), then the head movements of the user 25 may be determined by an IMU, or another type of accelerometer sensor.

In some implementations, the device 10 includes an eye tracking system for detecting eye position and eye movements. For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user 25. Moreover, the illumination source of the device 10 may emit NIR light to illuminate the eyes of the user 25 and the NIR camera may capture images of the eyes of the user 25. In some implementations, images captured by the eye tracking system may be analyzed to detect position and movements of the eyes of the user 25, or to detect other information about the eyes such as pupil dilation or pupil diameter. Moreover, the point of gaze estimated from the eye tracking images may enable gaze-based interaction with content shown on the near-eye display of the device 10.

In some implementations, the device 10 has a graphical user interface (GUI), one or more processors, memory and one or more modules, programs or sets of instructions stored in the memory for performing multiple functions. In some implementations, the user 25 interacts with the GUI through finger contacts and gestures on the touch-sensitive surface. In some implementations, the functions include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In some implementations, the device 10 employs various physiological sensor, detection, or measurement systems. Detected physiological data may include, but is not limited to, EEG, electrocardiogramactromyography (EMG), functional near infrared spectroscopy signal (fNIRS), blood pressure, skin conductance, or pupillary response. The device 10 maybe communicatively coupled to an additional sensor. For example, an external sensor (e.g., an EDA sensor) maybe communicatively coupled to device 10 via a wired or wireless connection, and the external sensor may be located on the skin of the user 25 (e.g., on the user's arm, or placed on the hand/fingers of the user). For example, the sensor can be utilized for detecting EDA (e.g., skin conductance), heart rate, or other physiological data that utilizes contact with the skin of a user. Moreover, the device 10 (using one or more sensors) may simultaneously detect multiple forms of physiological data in order to benefit from synchronous acquisition of physiological data. Moreover, in some implementations, the physiological data represents involuntary data, e.g., responses that are not under conscious control. For example, a pupillary response may represent an involuntary movement.

In some implementations, one or both eyes 45 of the user 25, including one or both pupils 50 of the user 25 present physiological data in the form of a pupillary response (e.g., pupillary data 40). The pupillary response of the user 25 results in a varying of the size or diameter of the pupil 50, via the optic and oculomotor cranial nerve. For example, the pupillary response may include a constriction response (miosis), e.g., a narrowing of the pupil, or a dilation response (mydriasis), e.g., a widening of the pupil. In some implementations, the device 10 may detect patterns of physiological data representing a time-varying pupil diameter.

In some implementations, a pupillary response may be in response to an auditory feedback that one or both ears 60 of the user 25 detect (e.g., an audio notification to the user). For example, device 10 may include a speaker 12 that projects sound via sound waves 14. The device 10 may include other audio sources such as a headphone jack for headphones, a wireless connection to an external speaker, and the like.

FIG. 2 illustrates a pupil 50 of the user 25 of FIG. 1 in which the diameter of the pupil 50 varies with time. Pupil diameter tracking may be potentially indicative of a physiological state of a user. As shown in FIG. 2, a present physiological state (e.g., present pupil diameter) may vary in contrast to a past physiological state (e.g., past pupil diameter 55). For example, the present physiological state may include a present pupil diameter and a past physiological state may include a past pupil diameter.

The physiological data may vary in time and the device 10 may use the physiological data to measure one or both of a user's physiological response to the visual characteristic 30 or the user's intention to interact with content 20. For example, when presented with content 20, which may include an interactive element, by a device 10, the user 25 may select the interactive element without requiring the user 25 to complete a physical button press. In some implementations, the physiological data may include the physiological response of a visual or an auditory stimulus of a radius of the pupil 50 after the user 25 glances at content 20, measured via eye-tracking technology (e.g., via a HMD). In some implementations, the physiological data includes EEG amplitude/frequency data measured via EEG technology, or EMG data measured from EMG sensors or motion sensors.

Returning to FIG. 1, a physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 3A:
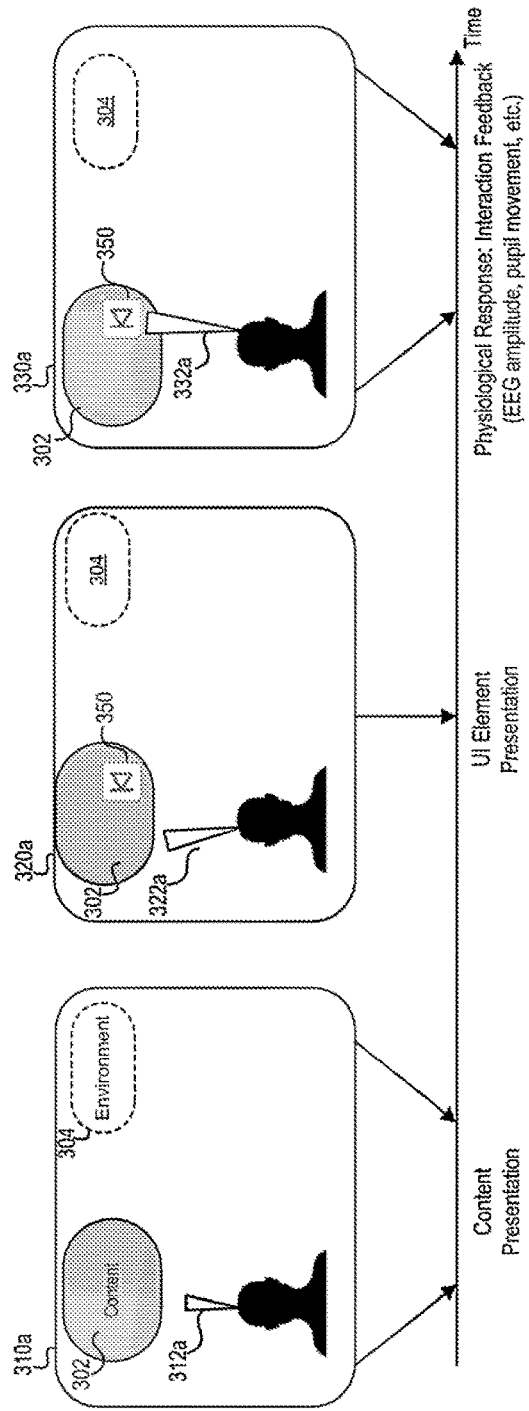
FIGS. 3A and 3B illustrate detecting an interaction event viewing content based on physiological data in accordance with some implementations.
Figure 3B:
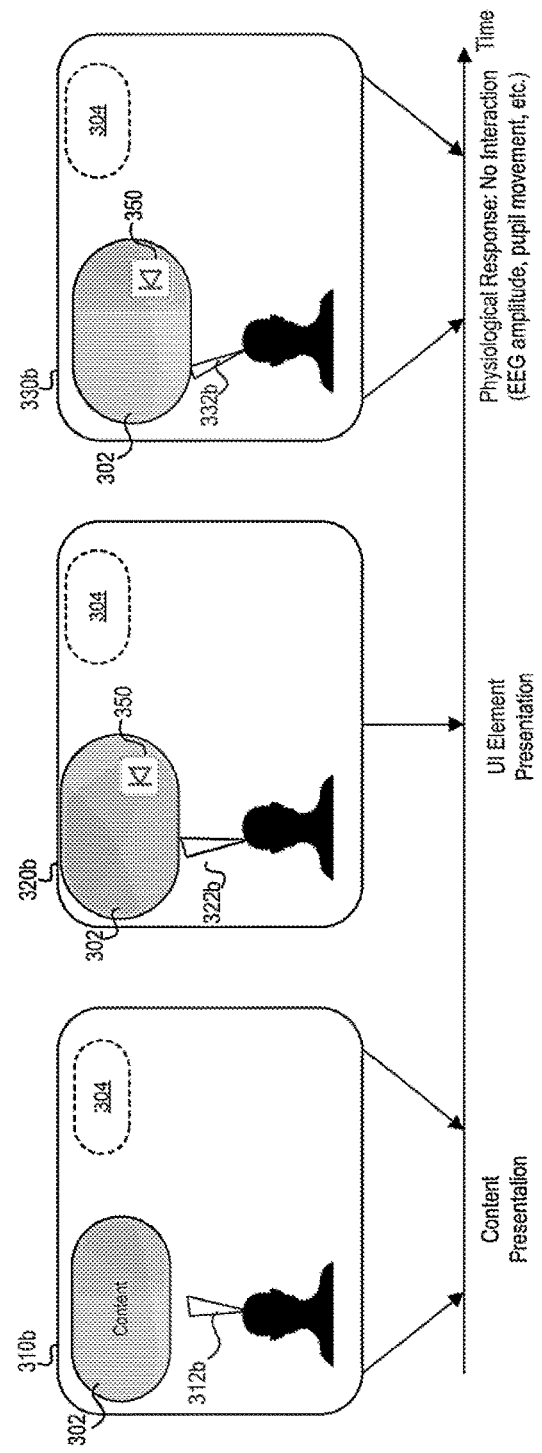

FIGS. 3A and 3B illustrate assessing whether there is an interaction event viewing content based on physiological data. FIG. 3A illustrates a user (e.g., user 25 of FIG. 1) being presented with content 302 in an environment 304 during a content presentation where the user, via obtained physiological data, has a physiological response to the content (e.g., the user looks towards portions of the content as detected by eye gaze characteristic data). For example, at content presentation instant 310a, a user is being presented with content 302 that includes visual content (e.g., a video), and the user's physiologic data such as pupillary data 312a (e.g., eye gaze characteristic data) is monitored as a baseline. Then, at content presentation instant 320a, while the user pupillary data 322a is engaged (e.g., looking at) content 302, the content 302 presents interactive element 350. After a segment of time after the user's physiological data is analyzed (e.g., by a physiological data instruction set), as illustrated at content presentation instant 330a, the user's pupillary data 332a is now focused on the interactive element 350. Therefore, the content 302 may be updated based on the interaction/focus of the user upon the interactive element 350 (e.g., the user wants to select the virtual icon represented by interactive element 350).

FIG. 3B illustrates a similar example as FIG. 3A, except that the user does not focus his or her gaze upon the interactive element 350 (e.g., the user does not want to select the virtual icon being presented to him or her). For example, at content presentation instant 310b, a user is being presented with content 302 that includes visual content (e.g., a video), and the user's physiologic data such as pupillary data 312b (e.g., eye gaze characteristic data) is monitored as a baseline. Then, at content presentation instant 320b, while the user pupillary data 322b is engaged (e.g., looking at) content 302, the content 302 presents interactive element 350. After a segment of time after the user's physiological data is analyzed (e.g., by a physiological data instruction set), as illustrated at content presentation instant 330b, the user's pupillary data 332b is determined to not be focused on the interactive element 350. Thus, the content 302 may not be updated based on the interaction/focus of the user which is currently not on the interactive element 350 at content presentation instant 330b.

Figure 4C:
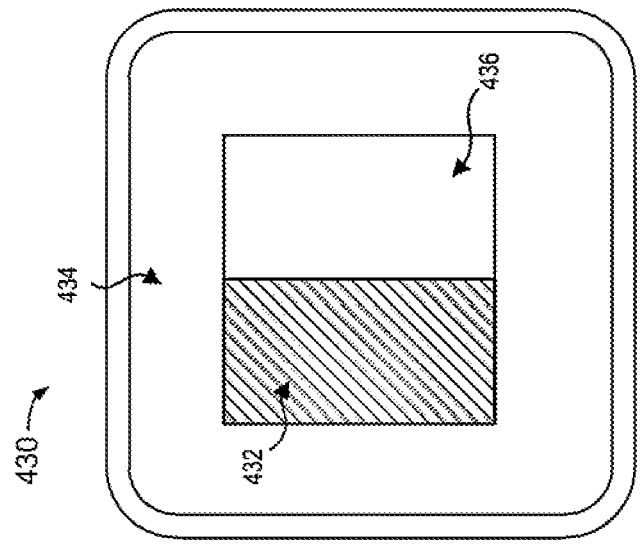
FIGS. 4A, 4B, and 4C illustrate example interaction elements that include regions having different illumination characteristics in accordance some implementations.
Figure 4B:
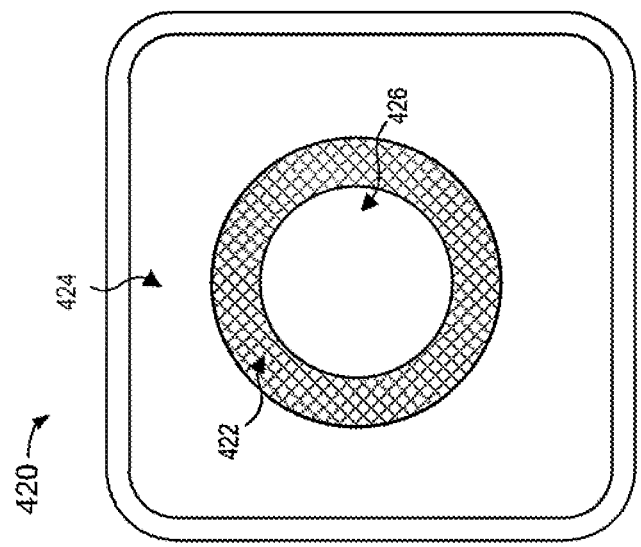
Figure 4A:
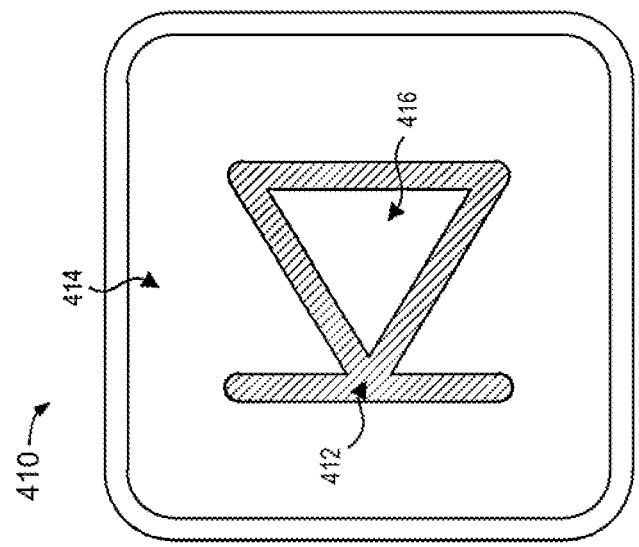

FIGS. 4A, 4B, and 4C illustrate example interaction elements that include regions having different illumination characteristics in accordance with some implementations. FIG. 4A presents interaction element 410, which is a closer view of the interaction element 350 of FIG. 3 that includes different regions, area 412, area 414, and area 416. Area 412 illustrates a brighter illumination characteristic that forms an example shape (e.g., a triangle and line adjacent to one of the corners). Area 414 illustrates an area with a different illumination characteristic (e.g., may be darker) in comparison to area 412.

FIG. 4B presents interaction element 420 (e.g., concentric circles) that includes different regions, area 422, area 424, and area 426. Area 422 illustrates a brighter illumination characteristic that forms an example shape (e.g., a circle). Area 424 and area 426 (e.g., areas outside and inside area 422, respectively) illustrate areas with different illumination characteristics (e.g., may be darker or lighter) in comparison to area 422.

FIG. 4C presents interaction element 430 (e.g., a square with two different illumination characteristics) that includes different regions, area 432, area 434, and area 436. Area 432 illustrates a brighter illumination characteristic that forms an example shape (e.g., a rectangle). Area 434 (e.g., the other half of the square) and area 436 (e.g., areas outside the square) illustrate areas with different illumination characteristics (e.g., may be darker or lighter) in comparison to area 432.

Although not illustrated as such in FIG. 4A, in some implementations, area 416, the area formed inside of the shape formed by area 412, may also include different illumination characteristics than both area 414 and area 412. For example, if an animation effect is provided for interaction element 410, the area 416 may flash in an alternate pattern with area 412, while area 414 remains constant. As discuss herein, the animation effect may be provided to the user if it is detected that the user has focused his or her attention at the interaction element for a certain period of time (e.g., great than two seconds), then the system may then generate the animation effect to let the user know that in an additional period of time the interaction element will be activated (e.g., the user wants to "click" on the particular icon represented by the interactive element 410).

In some implementations, if the user continuously keeps attending (e.g., "focused") on the area 412 of the interaction element 410 (e.g., an illuminated portion of the interaction element 410), then animation effects may initially begin on the interaction element 410 to indicate to the user that if they keep focusing on the area 412 of the interaction element 410, it will be selected or an action will occur (e.g., the user is clicking on a virtual icon based on their pupillary response). If interaction element 410 starts to change (e.g., become animated such as moves/shakes, changes in visual appearance, etc.) then the user may know to look away unless the user wants that icon selected. Thus, a user has to "dwell" a certain amount of time to be selected/clicked. For example, after some amount of time, such as a first interaction threshold (e.g., two seconds of focusing on area 412 of interactive element 410), the interactive element 410 changes/animates, and if a user continues to look at area 412 of interactive element 410, after a longer amount of time such as a second interaction threshold (e.g., an additional two seconds), then interactive element 410 is selected.

Figure 5:
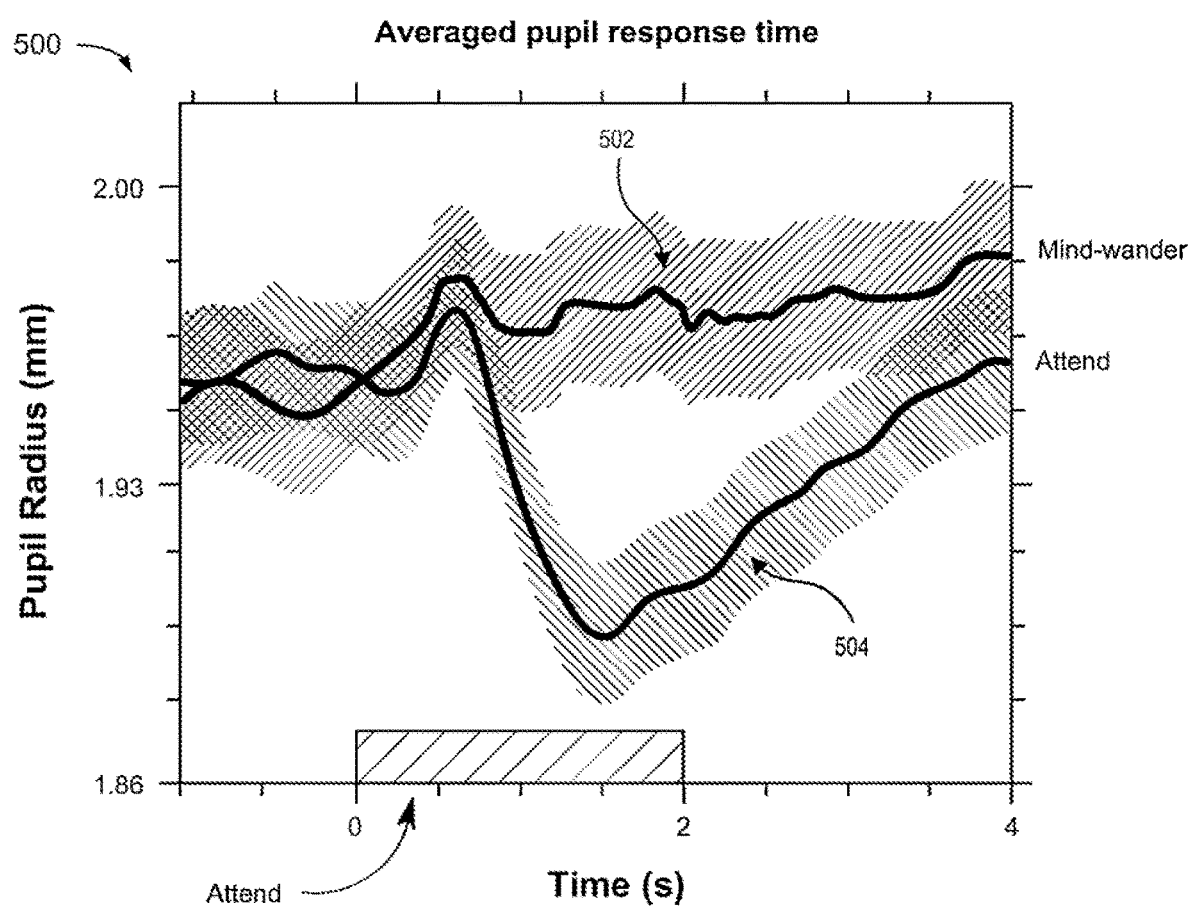
FIG. 5 is a chart illustrating averaged pupil response time of each participant based on voluntary feature attention by the participants in accordance with some implementations.

FIG. 5 is an example chart 500 illustrating averaged pupil response time of each participant based on voluntary feature attention by the participants in accordance with some implementations. For example, chart 500 illustrates data averaged over participants showing a robust pupil constriction (red curve) time-locked to the initiation of voluntary feature attention by the participant (right). For example, each participant maybe shown the interaction element 410 of FIG. 4A, and are told to focus at the particular area 412 that includes different illumination characteristics than the area 414. For example, for a first subset of data, the participants are told not to focus on that icon (e.g., interaction element 410), thus each user is "mind wandering", which is represented by the line 502. Then, for a second subset of data, the participants are told to focus on the illuminated portion of the icon (e.g., area 412 of interaction element 410), thus each user is "focused", which is represented by the line 504.

In some implementations, the presentation of the interaction element includes pixel information for a plurality of pixels, and determining that the pupillary response corresponds to directing attention to the region of the regions of the interaction element (e.g., area 412 of interaction element 410 of FIG. 4A) includes determining an estimated perceived luminance for each pixel in the region based on the pixel information. For example, the device 10 may collect pixel information from the display and converts the RGB values into an estimated perceived luminance. In some implementations, estimated perceived luminance may be calculated by using a linear formula: Lum=(0.21R+0.72G+

0.07B). Additionally, or alternatively, estimated perceived luminance may be calculated by using a nonlinear formula: Lum=sqrt($0.299R^2+0.587G^2+0.114B^2$). Moreover, in some implementations, estimated perceived luminance may be determined through feature embeddings via a machine learning model.

Figure 6:
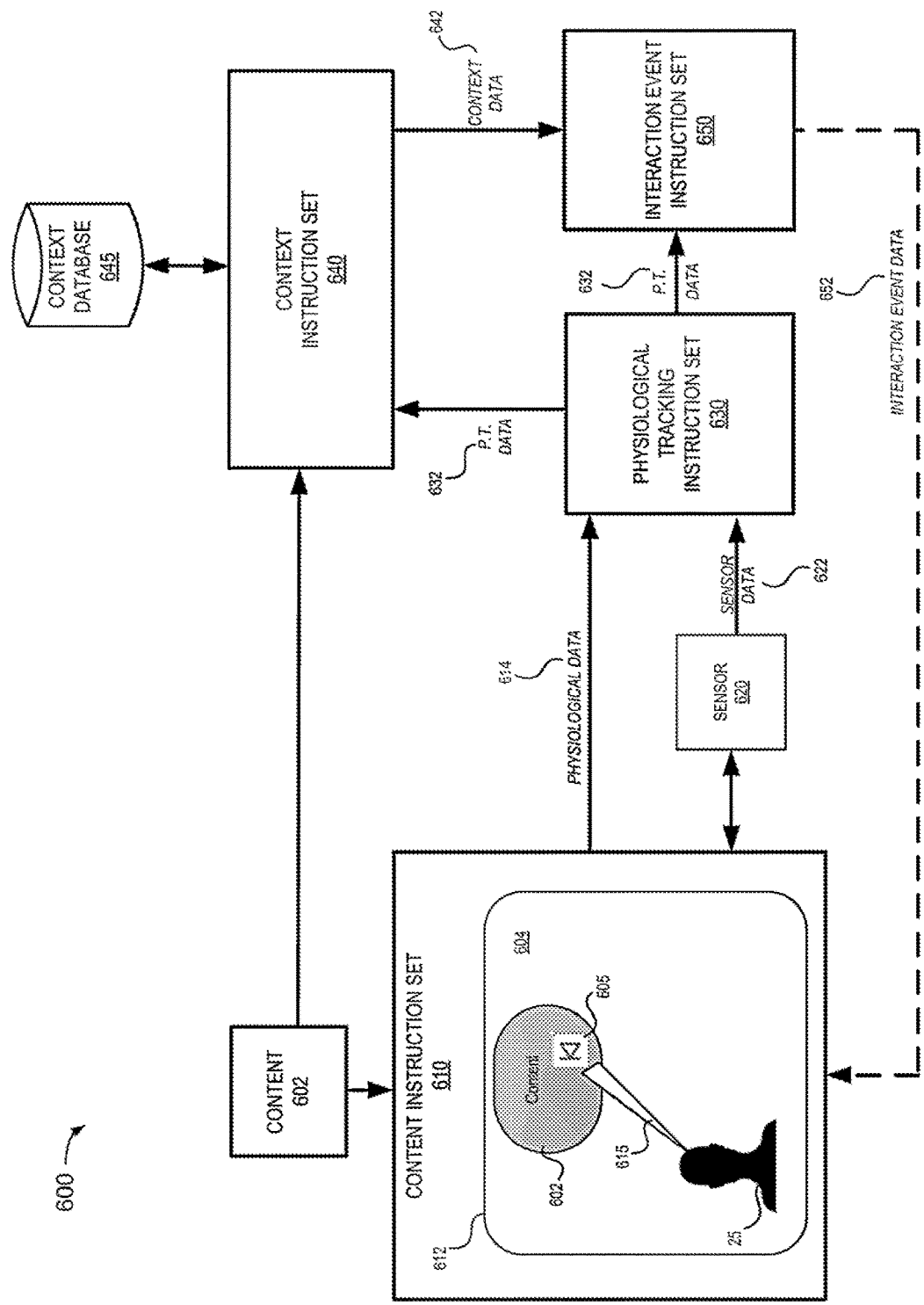
FIG. 6 illustrates a system diagram for detecting an interaction event viewing content based on physiological data in accordance with some implementations.

In some implementations, determining an interaction event includes determining scene-induced pupil response variation characteristics for the regions of the interaction element, and determining the interaction event during the presentation of the interaction element based on the scene-induced pupil response variation characteristics for the regions of the interaction element. A method may include subtracting from the pupil response the low-level scene-induced pupil response variation as given by the calculated perceived luminance or by the feature embeddings via a machine learning model. For example, when a user's gaze intersects with a user interface element (e.g., area 412 of interaction element 410 of FIG. 4A), a machine learning algorithm predicts "click" or "no click" for each time point, based on the presence of an attention-induced pupil response (e.g., after controlling for the low-level perceived luminance.) In some implementations, the techniques described herein can utilize a training or calibration sequence to adapt to the specific physiological characteristics of a particular user 25. In some implementations, the techniques present the user 25 with a training scenario in which the user 25 is instructed to interact with on-screen items (e.g., interactive objects). By providing the user 25 with a known intent or area of interest (e.g., via instructions), the techniques can record the user's physiological data (e.g., pupillary data 40) and identify a pattern associated with the user's physiological data. In some implementations, the techniques can change a visual characteristic 30 (e.g., a feedback mechanism) associated with content 20 in order to further adapt to the unique physiological characteristics of the user 25. For example, the techniques can direct a user to mentally select a button (e.g., an interactive element) associated with an identified area in the center of the screen on the count of three and record the user's physiological data (e.g., pupillary data 40) to identify a pattern associated with the user's interaction event. Moreover, the techniques can change or alter a visual characteristic associated with the feedback mechanism in order to identify a pattern associated with the user's physiological response to the altered visual characteristic. In some implementations, the pattern associated with the physiological response of the user 25 is stored in a user profile associated with the user and the user profile can be updated or recalibrated at any time in the future. For example, the user profile could automatically be modified over time during a user experience to provide a more personalized user experience (e.g., a personal educational experience for optimal learning experience while studying). In some implementations, a "click" threshold may be utilized for training a machine learning model. For example, a "click" threshold may be increased or decreased in real-time to maximize true positive events and minimize false positives. Additionally, or alternatively, in some implementations, implicit feedback from the user (e.g., if a sequence of interactions indicates one interaction was an error) may be used to determine true versus false positives in real-time and the "click" threshold may be adapted by the system accordingly. In some implementations, the techniques described herein can utilize a training process or calibration sequence to involve "gamification", where the user learns to achieve a certain task over time where there is an animation that corresponds to the real-time output of a machine learning model prediction about the probability of click. For example, controlling and closing a ring animation, where the ring closes in proportion to the model's predicated click probability. FIG. 6 is a system flow diagram of an example environment 600 in which an interaction event assessment system can assess an interaction event of a user based on physiological data according to some implementations. In some implementations, the system flow of the example environment 600 is performed on a device (e.g., device 10 of FIG. 1), such as a mobile device, desktop, laptop, or server device. The content of the example environment 600 can be displayed on a device (e.g., device 10 of FIG. 1) that has a screen (e.g., display 15) for displaying images and/or a screen for viewing stereoscopic images such as an HMD. In some implementations, the system flow of the example environment 600 is performed on processing logic, including hardware, firmware, software, or a combination thereof. In some implementations, the system flow of the example environment 600 is performed on a processor executing code stored in a non-transitory computer-readable medium (e.g., a memory).

The system flow of the example environment 600 acquires and presents content (e.g., video content or a series of image data) to user 25, analyzes the content and/or the environment for context data, obtains physiological data associated with the user during presentation of the content, assesses a user's intent to interact with the interaction element 605 based on the physiological data of the user and updates the content based on the interaction event (e.g., if the user 25 focuses on the interaction element 605 for a certain period of time to activate or select the interaction element 605). For example, an interaction event assessment technique described herein determines, based on obtained physiological data, the user's intent to interact with the interaction element 605 during an experience (e.g., watching a video) by updating the content that is based on the interaction event (e.g., a notification, auditory signal, an alert, and the like, that alerts the user that they have selected the interaction element 605 during the presentation of content 602).

The example environment 600 includes a content instruction set 610 that is configured with instructions executable by a processor to provide and/or track content 602 for display on a device (e.g., device 10 of FIG. 1). For example, the content instruction set 610 provides content presentation instant 612 that includes content 602 to a user 25 while user is within a physical environment 604 (e.g., a room, outside, etc.). For example, content 602 may include background image(s) and sound data (e.g., a video). The content presentation instant 612 could be an XR experience, or content presentation instant 612 could be a MR experience that includes some CGR content and some images of a physical environment. Alternatively, the user could be wearing a HMD and is looking at a real physical environment either via a live camera view, or the HMD allows a user to look through the display, such as wearing smart glasses that user can see through, but still be presented visual and/or audio cues. During an experience, while a user 25 is viewing the content 602, pupillary data 615 (e.g., pupillary data 40 such as eye gaze characteristic data) of the user's eyes can be monitored and sent as physiological data 614. Additionally, other physiological data can be monitored and sent as physiological data 614 such as head movement data obtained from an IMU or image data.

The environment 600 further includes a physiological tracking instruction set 630 to track a user's physiological attributes as physiological tracking data 632 using one or more of the techniques discussed herein or as otherwise may be appropriate. For example, the physiological tracking instruction set 630 may acquire physiological data 614 (e.g., pupillary data 615) from the user 25 viewing the content 602. Additionally, or alternatively, a user 25 may be wearing a sensor (e.g., such as an EEG sensor, an EDA sensor, heart rate sensor, etc.) that generates sensor data 626 (e.g. IMU or pose data, EEG data, EDA data, heart rate data, and the like) as additional physiological data. Thus, as the content 602 is presented to the user as content presentation instant 612, the physiological data 614 (e.g., pupillary data 615) and/or sensor data 626 is sent to the physiological tracking instruction set 630 to track a user's physiological attributes as physiological tracking data 632, using one or more of the techniques discussed herein or as otherwise may be appropriate.

In an example implementation, the environment 600 further includes a context instruction set 640 that is configured with instructions executable by a processor to obtain the experience data presented to the user (e.g., content 602) and other sensor data (e.g., image data of the environment 604, the user's 25 face and/or eye's, etc.), and generate context data 642 (e.g., identifying people, objects, etc. of the content 602 and the environment 604). For example, the context instruction set 640 acquires content 602 and sensor data 622 (e.g., image data) from the sensor 620 (e.g., an RGB camera, a depth camera, etc.) and determines context data 642 based on identifying areas of the content while the user is viewing the presentation of the content 602 (e.g., a first time viewed content/video). Alternatively, the context instruction set 640 selects context data associated with content 602 from a context database 645 (e.g., if the content 602 was previously analyzed by the context instruction set, i.e., a previously viewed/analyzed video). In some implementations, the context instruction set 640 generates a scene understanding associated with content 602 and/or environment 604 as the context data 642. For example, the scene understanding can be utilized to track the overall context of what the user may be focused on during the presentation of content 602, or where the user is, what the user is doing, what physical objects or people are in the vicinity of the user with respect to the environment 604.

In an example implementation, the environment 600 further includes an interaction event instruction set 650 that is configured with instructions executable by a processor to assess the user's 25 intent to interact with the interaction element 605 based on a physiological response (e.g., eye gaze response via pupillary data 615) using one or more of the techniques discussed herein or as otherwise may be appropriate. For example, intent of the user 25 to interact with the interaction element 605 that may be assessed such as determining that the user 25 is focused on a particular illuminated region of the interaction element 605 (e.g., such as area 412 of interaction element 410 of FIG. 4A). In particular, the interaction event instruction set 650 acquires physiological tracking data 632 from the physiological tracking instruction set 630 and determines the intent of the user 25 to interact with (select) the interaction element 605 during the presentation of the content 602 while the user is watching content 602. In some implementations, the interaction event instruction set 650 can then provide interaction event data 652 (e.g., data that signals that the user selected the interaction element 605) to the content instruction set 610 based on the interaction event assessment.

In some implementation, the interaction event instruction set 650 also acquires context data 642 from the context instruction set 640 (e.g., scene understanding data) with the physiological tracking data 632 to determine the intent of the user 25 to interact with (select) the interaction element 605 during the presentation of the content 602. For example, the context data 642 may provide a scene analysis that can be used by the interaction event instruction set 650 to understand what the person is looking at, where they are at, etc., and improve the determination of the intent of the user to select the interaction element 605.

Figure 7:
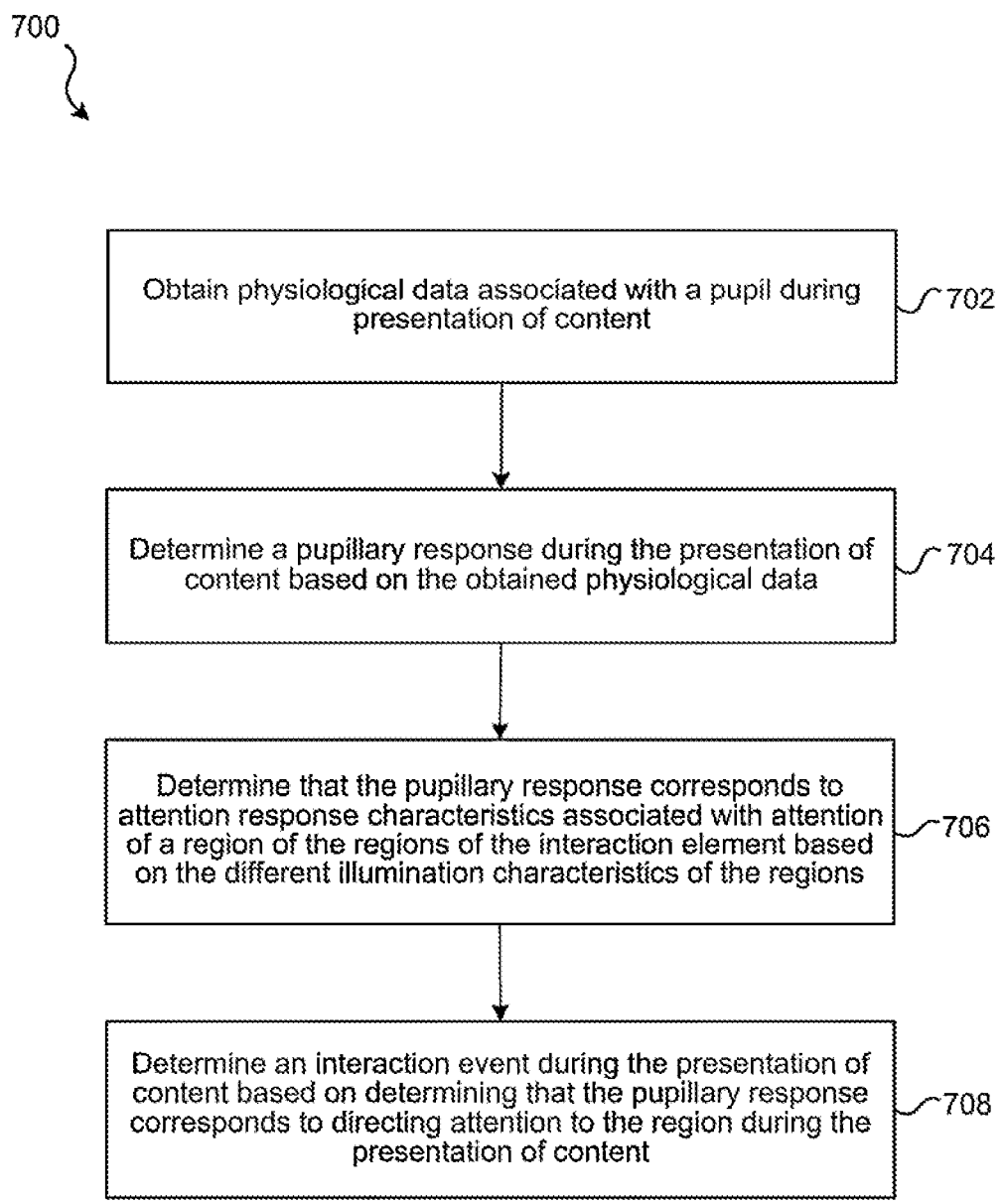
FIG. 7 is a flowchart representation of a method for determining an interaction event viewing content based on physiological data, and updating the content based on the interaction event in accordance with some implementations.

FIG. 7 is a flowchart illustrating an exemplary method 700. In some implementations, a device such as device 10 (FIG. 1) performs the techniques of method 700 to determine an intent to interact with an interaction element (e.g., an interaction event) while the user is viewing content based on physiological data, and updating the content based on the interaction event. For example, the method 700 may identify that, during a particular segment of an experience, the gaze characteristics (e.g., pupil dilation vs. constriction, stable gaze direction, and/or velocity of pupil movements) corresponds to a user focusing on a particular icon or user interface element (referred to herein as an "interactive element"). For example, a user may direct their attention to a bright feature in an icon or other user interface element in order to initiate a "click" or other interaction. This can be used as a user interface selection tool, device wake-up signal, etc., and might be combined with other eye or touch-based mechanisms to improve SNR, robustness, and response time.

In some implementations, the techniques of method 700 are performed on a mobile device, desktop, laptop, HMD, or server device. In some implementations, the method 700 is performed on processing logic, including hardware, firmware, software, or a combination thereof. In some implementations, the method 700 is performed on a processor executing code stored in a non-transitory computer-readable medium (e.g., a memory).

At block 702, the method 700 obtains physiological data associated with a pupil during presentation of an interaction element, and the interaction element includes regions having different illumination characteristics. For example, the illumination features may include relatively dark or bright regions (e.g., area 412 and area 414 of FIG. 4A). In some implementations, the different illumination characteristics of the regions of the interaction element includes one or more dark regions and one or more bright regions.

In some implementations, obtaining physiological data includes EEG amplitude/frequency, pupil modulation, eye gaze saccades, head movements, and the like, from which pupil response/gaze direction/movement can be determined. In some implementations, obtaining physiological data (e.g., pupillary data 40) is associated with a gaze of a user that may involve obtaining images of the eye or electrooculography signal (EOG) data from which gaze direction and/or movement can be determined. In some implementations, the physiological data includes at least one of skin temperature, respiration, photoplethysmogram (PPG), electrodermal activity (EDA), eye gaze tracking, and pupillary movement that is associated with the user. In some implementations, obtaining physiological data includes head movements (e.g., obtained from an IMU or from image sensor data).

In some implementations, determining the movement and/or the location and features of the head 27 of the user 25 (e.g., an edge of the eye, a nose or a nostril) are extracted by the device 10 and used in finding coarse location coordinates of the eyes 45 of the user 25, thus simplifying the determination of precise eye 45 features (e.g., position, gaze direction, etc.) and making the gaze characteristic(s) measurement more reliable and robust. Furthermore, the device 10 may readily combine the 3D location of parts of the head 27 with gaze angle information obtained via eye part image analysis in order to identify a given on-screen object at which the user 25 is looking at any given time. In some implementations, the use of 3D mapping in conjunction with gaze tracking allows the user 25 to move his or her head 27 and eyes 45 freely while reducing or eliminating the need to actively track the head 27 using sensors or emitters on the head 27.

By tracking the eyes 45, some implementations reduce the need to re-calibrate the user 25 after the user 25 moves his or her head 27. In some implementations, the device 10 uses depth information to track the pupil's 50 movement, thereby enabling a reliable present pupil diameter to be calculated based on a single calibration of user 25. Utilizing techniques such as pupil-center-corneal reflection (PCCR), pupil tracking, and pupil shape, the device 10 may calculate the pupil diameter, as well as a gaze angle of the eye 45 from a fixed point of the head 27, and use the location information of the head 27 in order to re-calculate the gaze angle and other gaze characteristic(s) measurements. In addition to reduced recalibrations, further benefits of tracking the head 27 may include reducing the number of light projecting sources and reducing the number of cameras used to track the eye 45.

Some implementations obtain physiological data and other user information to help improve a user experience. In such processes, user preferences and privacy should be respected, as examples, by ensuring the user understands and consents to the use of user data, understands what types of user data are used, has control over the collection and use of user data and limiting distribution of user data, for example, by ensuring that user data is processed locally on the user's device. Users should have the option to opt in or out with respect to whether their user data is obtained or used or to otherwise turn on and off any features that obtain or use user information. Moreover, each user will have the ability to access and otherwise find out anything that the system has collected or determined about him or her. User data is stored securely on the user's device. User data that is used as input to a machine learning model is stored securely on the user's device, for example, to ensure the user's privacy. The user's device may have a secure storage area, e.g., a secure enclave, for securing certain user information, e.g., data from image and other sensors that is used for face identification, face identification, or biometric identification. The user data associated with the user's body and/or attentive state may be stored in such a secure enclave, restricting access to the user data and restricting transmission of the user data to other devices to ensure that user data is kept securely on the user's device. User data may be prohibited from leaving the user's device and may be used only in machine learning models and other processes on the user's device.

At block 704, the method 700 determines, based on the obtained physiological data, a pupillary response during the presentation of the interaction element. For example, pupillary response characteristics may include measuring a variability of the pupillary radius. In some implementations, variability may be measured based on range, variance, and/or standard deviation.

In some implementations, the pupillary response is a direction of the pupillary response, a velocity of the pupillary response, or pupillary fixations (e.g., derived from eye gaze dynamics and saccade characteristics). In some implementations, the pupillary response is derived from a saccade characteristic (e.g., microsaccades and saccadic intrusions). In some implementations, saccade characteristics are a separate attribute or type of physiological data than the pupillary response, such that the method 700 may alternatively, at block 704, determine a saccade characteristic other than a pupillary response during the presentation of the interaction element. For example, saccade characteristics may include measuring microsaccades and/or saccadic intrusions.

In some implementations, determining the pupillary response during the presentation of the interaction element is based on determining a variability of the pupillary response to a threshold. An example threshold limit for the variability of the pupillary response may be based on a machine learning model output. For example, if the machine learning model takes the physiological data as input and outputs a probability of click intent (e.g., 70%), then a determination may be made that any pupil response causing a probability under 70% is no click, while a pupil response leading to a machine learning model output at or above 70% is a click.

Another type of threshold could be an outlier detection, e.g., if the pupillary response or other physiological data changes beyond an accepted range, and that data may be rejected and considered as noise. Likewise, if response changes are so small that the system would have low confidence in measuring such a small change, the system might also reject that data as noise.

At block 706, the method 700 determines that the pupillary response corresponds to attention response characteristics associated with attention of a region of the regions of the interaction element based on the different illumination characteristics of the regions. For example, a user may exhibit attention response characteristics as he or she is focusing on a particular bright or dark region of an interaction element, such as the different regions area 412, area 414, and area 416 in FIG. 4A. In some implementations, each region of the interaction element includes a level of luminance and the different illumination characteristics of the regions are based on the level of luminance of each region with respect to an illuminance threshold level. For example, different illumination characteristics of the interaction element may include a determination of a ratio of bright versus dark surface area, size (in visual degrees), temporal variation (flicker, sinusoidal, random luminance change, etc.), spatial frequency, and/or contrast (difference between bright and dark regions in the item). Additionally, or alternatively, the spatial layout of the different regions of the interactive element may affect the pupillary response corresponding to directing attention to a region of the regions of the interaction element. For example, the spatial layout of the different regions of the interactive element might be a single large uniform illuminated region. Alternatively, the spatial layout of the interactive element may include small bright and dark regions randomly intermixed (e.g., pointilized) to induce a "push-pull" effect between the bright versus dark regions.

At block 708, the method 700 determines an interaction event during the presentation of the interaction element based on determining that the pupillary response corresponds to directing attention to the region during the presentation of the interaction element.

In some implementations, a machine learning algorithm may be determined based predicting a "click" or "no click" for each time point based on the presence of an attention-induced pupil response (e.g., after controlling for the low-level perceived luminance). In an exemplary embodiment, the presentation of the interaction element includes pixel information for a plurality of pixels and determining that the pupillary response corresponds to directing attention to the region of the regions of the interaction element includes determining an estimated perceived luminance for each pixel in the region based on the pixel information. In some implementations, determining an interaction event includes determining scene-induced pupil response variation characteristics for the regions of the interaction element, and determining the interaction event during the presentation of the interaction element based on the scene-induced pupil response variation characteristics for the regions of the interaction element. For example, when a user's gaze intersects with a user interface element (e.g., interaction element 350 of FIG. 3A), a machine learning protocol can predict a "click" or "no click" for each time point, based on the presence of an attention-induced pupil response. Therefore, in some implementations, the interaction event may be classified using a machine learning technique based on the pupillary response and the different illumination characteristics of the regions for the interaction element (e.g., a machine learning "click" model).

In some implementations, the machine learning model is a neural network (e.g., an artificial neural network), decision tree, support vector machine, Bayesian network, or the like. These labels may be collected from the user beforehand, or from a population of people beforehand, and fine-tuned later on individual users. Creating this labeled data may require many users going through an experience (e.g., a meditation experience) where the users listen to natural sounds with intermixed natural-probes (e.g., an auditory stimulus) and then randomly are asked how focused or relaxed they were (e.g., interaction event) shortly after a probe was presented. The answers to these questions can generate a label for the time prior to the question and a deep neural network or deep long short term memory (LSTM) network might learn a combination of features specific to that user or task given those labels (e.g., low interaction event, high interaction event, etc.).

In some implementations, the method 700 further includes adjusting content in response to determining the interaction event. For example, as illustrated in the system flow diagram of environment 600 of FIG. 6, when is determined that user's intent is to "click" (e.g., interact/focus) on the interaction element 605, the interaction event instruction set 650 provides interaction event data 652 to the content instruction set 610 to update the content (e.g., change the content based on the selection of the icon—interaction element 605).

In some implementations, the techniques described herein obtain physiological data (e.g., pupillary data 40, EEG amplitude/frequency data, pupil modulation, eye gaze saccades, head movements, etc.) from the user based on identifying typical interactions of the user with the experience. For example, the techniques may determine that a variability of an eye gaze characteristic of the user correlates with an interaction with the experience. Additionally, the techniques described herein may then adjust a visual characteristic of the experience, or adjust/change a sound associated with the interaction element, to enhance physiological response data associated with future interactions with the experience and/or the interaction element presented within the experience. Moreover, in some implementations, changing an interaction element after the user interacts with the experience informs the physiological response of the user in subsequent interactions with the interaction element or a particular segment of the experience. For example, the user may present an anticipatory physiological response associated with the change within the interaction element (e.g., a change in illuminance of the interaction element). Thus, in some implementations, the technique identifies an intent of the user to interact with the interaction element based on an anticipatory physiological response. For example, the technique may adapt or train an instruction set by capturing or storing physiological data of the user based on the interaction of the user with the experience, and may detect a future intention of the user to interact with the experience by identifying a physiological response of the user in anticipation of the presentation of the enhanced/updated interaction element.

In some implementations, customization of the experience could be controlled by the user. For example, a user could select the experience he or she desires, such as he or she can choose the ambience, background scene, music, etc. Additionally, the user could alter the threshold of selecting the interactive element. For example, the user can customize the sensitivity of triggering the interactive element based on prior experience of a session. For example, a user may desire to not have as many notifications and allow some mind wandering (e.g., eye position deviations) before an interactive element is triggered. Thus, particular experiences can be customized on triggering a threshold when higher criteria is met. For example, a user may have to look at a particular interactive element for longer (or shorter) than the previously discussed threshold of two seconds to toggle the interactive element (e.g. shakes or flashes) and/or a longer (or shorter) threshold of two seconds after the toggle to actually select the interactive element. For example, the user may want the threshold set at three seconds before interactive element is toggled, but only want one additional second (e.g., after the interactive element is toggled and begins to shake) before the interactive element is actually selected and thus the system performs the action of the user interface element being selected.

In some aspects, the method 700 determines a context of the experience based on sensor data of the environment. For example, determining a context may involve using computer vision to generate a scene understanding of the visual and/or auditory attributes of the environment—where is the user, what is the user doing, what objects are nearby. Additionally, a scene understanding of the content presented to the user could be generated that includes the visual and/or auditory attributes of what the user was watching.

In some aspects, different contexts of the content presented and the environment are analyzed to determine where the user is, what the user is doing, what objects or people are nearby in the environment or within the content, what the user did earlier (e.g., meditated in the morning). Additionally, context analysis may include image analysis (semantic segmentation), audio analysis (jarring sounds), location sensors (where user is), motion sensors (fast moving vehicle), and even access other user data (e.g., a user's calendar). In an exemplary implementation, the method 700 may further include determining the context of the experience by generating a scene understanding of the environment based on the sensor data of the environment, the scene understanding including visual or auditory attributes of the environment, and determining the context of the experience based on the scene understanding of the environment.

In some implementations, the sensor data includes image data, and generating the scene understanding is based at least on performing semantic segmentation of the image data and detecting one or more objects within the environment based on the semantic segmentation. In some implementations, determining the context of the experience includes determining an activity of the user based on the scene understanding of the environment. In some implementations, the sensor data includes location data of the user, and determining the context of the experience includes determining a location of the user within the environment based on the location data.

In some implementations, determining the context of the experience includes determining an activity of the user based on a user's schedule. For example, the system may access a user's calendar to determine if a particular event is occurring when the particular interaction event is assessed. For example, different applications may include different interaction elements to be provided to the user to select via his or her pupillary response (eye gaze characteristics).

In some implementations, one or more pupillary or EEG characteristics may be determined, aggregated, and used to classify the user's intent to determine an interaction event occurrence using statistical or machine learning techniques. In some implementations, the physiological data is classified based on comparing the variability of the physiological data to a threshold.

In some implementations, the method 700 further includes adjusting content corresponding to the experience based on the interaction event (e.g., customized to the interaction event). For example, content recommendation for a content developer can be provided based on determining interaction events during the presented experience and changes of the experience or content presented therein. For example, the user may focus well when particular types of content are provided. In some implementations, the method 700 may further include identifying content based on similarity of the content to the experience, and providing a recommendation of the content to the user based on determining that the user has the interaction event during the experience (e.g., mind wandering). In some implementations, the method 700 may further include customizing content included in the experience based on the interaction event (e.g., breaking the content into smaller pieces).

In some implementations, an estimator or statistical learning method is used to better understand or make predictions about the physiological data (e.g., pupillary data characteristics, head movements, etc.). For example, statistics for pupillary data may be estimated by sampling a dataset with replacement data (e.g., a bootstrap method).

In some implementations, the techniques could be trained on many sets of user physiological data and then adapted to each user individually. For example, content creators can customize an experience (e.g., an instructional video) based on the user physiological data, such as a user may require background music, different ambient lighting for learning, or require more or less audio or visual cues to continue to maintain an attention state.

In some implementations, the techniques described herein can account for real-world environment 5 of the user 25 (e.g., visual qualities such as luminance, contrast, semantic context) in its evaluation of how much to modulate or adjust the presented content or interactive elements to enhance the physiological response (e.g., pupillary response) of the user 25 to the visual characteristic 30 (e.g., interactive elements).

In some implementations, the techniques described herein can utilize a training or calibration sequence to adapt to the specific physiological characteristics of a particular user 25, as described herein with reference to FIG. 5. In some implementations, the techniques present the user 25 with a training scenario in which the user 25 is instructed to interact with on-screen items (e.g., interactive objects). By providing the user 25 with a known intent or area of interest (e.g., via instructions), the techniques can record the user's physiological data (e.g., pupillary data 40) and identify a pattern associated with the user's physiological data. In some implementations, the techniques can change a visual characteristic 30 (e.g., a feedback mechanism) associated with content 20 in order to further adapt to the unique physiological characteristics of the user 25. For example, the techniques can direct a user to mentally select a button (e.g., an interactive element) associated with an identified area in the center of the screen on the count of three and record the user's physiological data (e.g., pupillary data 40) to identify a pattern associated with the user's interaction event. Moreover, the techniques can change or alter a visual characteristic associated with the feedback mechanism in order to identify a pattern associated with the user's physiological response to the altered visual characteristic. In some implementations, the pattern associated with the physiological response of the user 25 is stored in a user profile associated with the user and the user profile can be updated or recalibrated at any time in the future. For example, the user profile could automatically be modified over time during a user experience to provide a more personalized user experience (e.g., a personal educational experience for optimal learning experience while studying).

In some implementations, a machine learning model (e.g., a trained neural network) is applied to identify patterns in physiological data, including identification of physiological responses to presentation of content (e.g., content 20 of FIG. 1) during a particular experience (e.g., education, meditation, instructional, etc.). Moreover, the machine learning model may be used to match the patterns with learned patterns corresponding to indications of interest or intent of the user 25 to interact with the interaction element. In some implementations, the techniques described herein may learn patterns specific to the particular user 25. For example, the techniques may learn from determining that a peak pattern represents an indication of interest or intent of the user 25 in response to a particular visual characteristic 30 within the content and use this information to subsequently identify a similar peak pattern as another indication of interest or intent of the user 25. Such learning can take into account the user's relative interactions with multiple visual characteristics 30, in order to further adjust the visual characteristic 30 and enhance the user's physiological response to the experience and the presented content (e.g., focusing on particular areas of content versus other distracting areas).

In some implementations, the techniques described herein can identify a particular object within the content presented on the display 15 of the device 10 at a position in the direction of the user's gaze. Moreover, the techniques can change a state of the visual characteristic 30 associated with the particular object or the overall content experience responsively to a spoken verbal command received from the user 25 in combination with the identified interaction event 25. For example, a particular object within the content may be an icon associated with a software application, and the user 25 may gaze at the icon, say the word "select" to choose the application, and a highlighting effect may be applied to the icon. The techniques can then use further physiological data (e.g., pupillary data 40) in response to the visual characteristic 30 (e.g., an interactive element) to further identify an interaction event 25 as a confirmation of the user's verbal command. In some implementations, the techniques can identify a given interactive item responsive to the direction of the user's gaze, and to manipulate the given interactive item responsively to physiological data (e.g., variability of the gaze characteristics). The techniques can then confirm the direction of the user's gaze based on further identifying interaction events of a user with physiological data in response to interactions with the experience (e.g., interacting within an intense video game). In some implementations, the techniques can remove an interactive item or object based on the identified interest or intent. In other implementations, the techniques can automatically capture images of the content at times when an interest or intent of the user 25 is determined.

Figure 8:
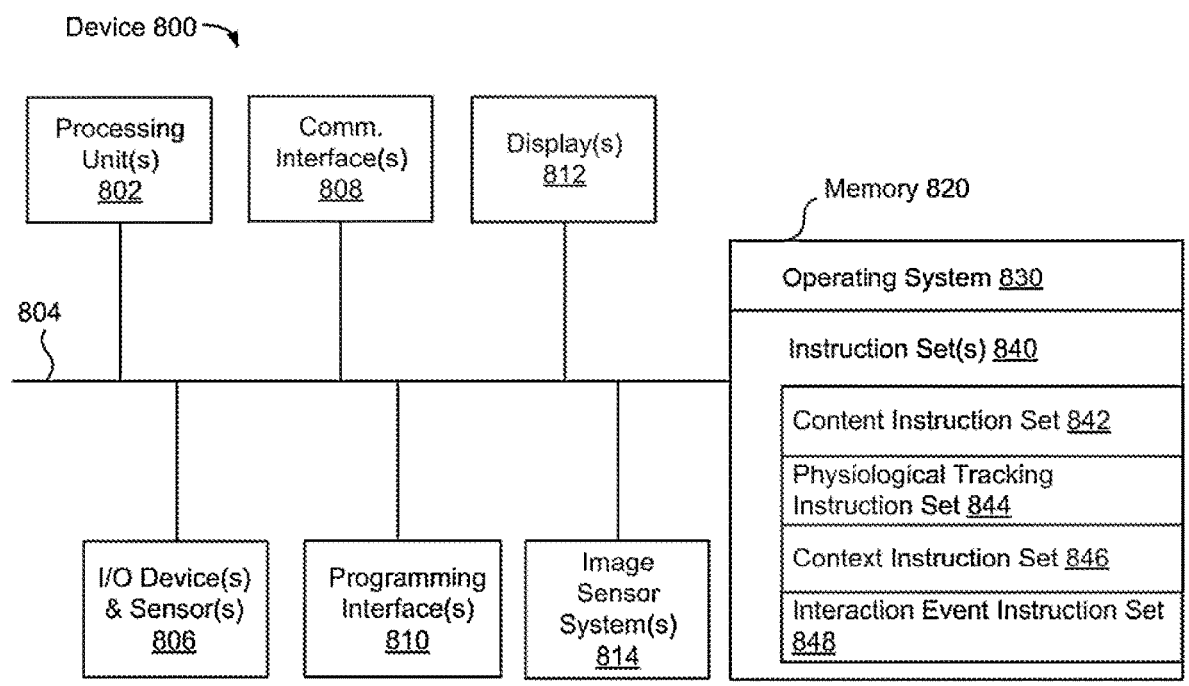
FIG. 8 illustrates device components of an exemplary device in accordance with some implementations.

FIG. 8 is a block diagram of an example device 800. Device 800 illustrates an exemplary device configuration for device 10. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 10 includes one or more processing units 802 (e.g., microprocessors, ASICs, FPGAS, GPUs, CPUs, processing cores, and/or the like), one or more input/output (I/O) devices and sensors 806, one or more communication interfaces 808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 810, one or more displays 812, one or more interior and/or exterior facing image sensor systems 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 812 are configured to present a view of a physical environment or a graphical environment to the user. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 812 correspond to diffractive, reflective, polarized, holographic, etc. waveguide displays. In one example, the device 10 includes a single display. In another example, the device 10 includes a display for each eye of the user.

In some implementations, the one or more image sensor systems 814 are configured to obtain image data that corresponds to at least a portion of the physical environment 5. For example, the one or more image sensor systems 814 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 814 further include illumination sources that emit light, such as a flash. In various implementations, the one or more image sensor systems 814 further include an on-camera image signal processor (ISP) configured to execute a plurality of processing operations on the image data.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 includes a non-transitory computer readable storage medium.

In some implementations, the memory 820 or the non-transitory computer readable storage medium of the memory 820 stores an optional operating system 830 and one or more instruction set(s) 840. The operating system 830 includes procedures for handling various basic system services and for performing hardware dependent tasks. In some implementations, the instruction set(s) 840 include executable software defined by binary information stored in the form of electrical charge. In some implementations, the instruction set(s) 840 are software that is executable by the one or more processing units 802 to carry out one or more of the techniques described herein.

The instruction set(s) 840 include a content instruction set 842, a physiological tracking instruction set 844, a context instruction set 846, and an interaction event instruction set 848. The instruction set(s) 840 may be embodied a single software executable or multiple software executables.

In some implementations, the content instruction set 842 is executable by the processing unit(s) 802 to provide and/or track content for display on a device. The content instruction set 842 may be configured to monitor and track the content over time (e.g., during an experience such as an education session) and/or to identify change events that occur within the content. In some implementations, the content instruction set 842 may be configured to inject change events into content (e.g., feedback mechanisms) using one or more of the techniques discussed herein or as otherwise may be appropriate. To these ends, in various implementations, the instruction includes instructions and/or logic therefor, and heuristics and metadata therefor.

In some implementations, the physiological tracking instruction set 844 is executable by the processing unit(s) 802 to track a user's physiological attributes (e.g., EEG amplitude/frequency, pupil modulation, eye gaze saccades, heart rate, EDA data, etc.) using one or more of the techniques discussed herein or as otherwise may be appropriate. To these ends, in various implementations, the instruction includes instructions and/or logic therefor, and heuristics and metadata therefor.

In some implementations, the context instruction set 846 is executable by the processing unit(s) 802 to determine a context of the experience and/or the environment (e.g., create a scene understanding to determine the objects or people in the content or in the environment, where the user is, what the user is watching, etc.) using one or more of the techniques discussed herein (e.g., object detection, facial recognition, etc.) or as otherwise may be appropriate. To these ends, in various implementations, the instruction includes instructions and/or logic therefor, and heuristics and metadata therefor.

In some implementations, the interaction event instruction set 848 is executable by the processing unit(s) 802 to assess the intent of the user to interact with an interaction element (e.g., an interaction event determination) based on physiological data (e.g., pupillary data) using one or more of the techniques discussed herein or as otherwise may be appropriate. To these ends, in various implementations, the instruction includes instructions and/or logic therefor, and heuristics and metadata therefor.

Although the instruction set(s) 840 are shown as residing on a single device, it should be understood that in other implementations, any combination of the elements may be located in separate computing devices. Moreover, FIG. 8 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 9:
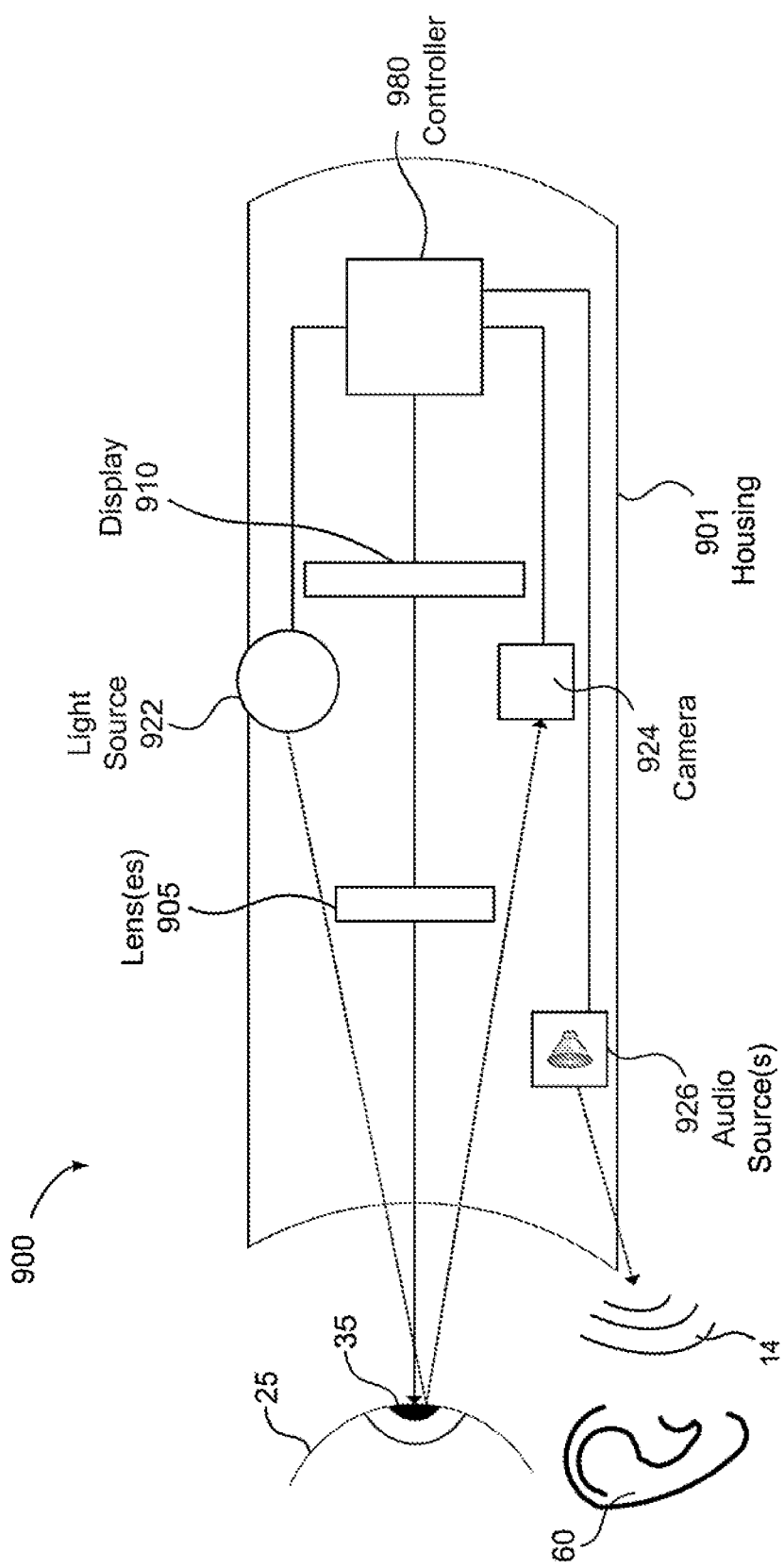
FIG. 9 illustrates an example head-mounted device (HMD) in accordance with some implementations.

FIG. 9 illustrates a block diagram of an exemplary head-mounted device 900 in accordance with some implementations. The head-mounted device 900 includes a housing 901 (or enclosure) that houses various components of the head-mounted device 900. The housing 901 includes (or is coupled to) an eye pad (not shown) disposed at a proximal (to the user 25) end of the housing 901. In various implementations, the eye pad is a plastic or rubber piece that comfortably and snugly keeps the head-mounted device 900 in the proper position on the face of the user 25 (e.g., surrounding the eye of the user 25).

The housing 901 houses a display 910 that displays an image, emitting light towards or onto the eye of a user 25. In various implementations, the display 910 emits the light through an eyepiece having one or more lenses 905 that refracts the light emitted by the display 910, making the display appear to the user 25 to be at a virtual distance farther than the actual distance from the eye to the display 910. For the user 25 to be able to focus on the display 910, in various implementations, the virtual distance is at least greater than a minimum focal distance of the eye (e.g., 8 cm). Further, in order to provide a better user experience, in various implementations, the virtual distance is greater than 1 meter.

The housing 901 also houses a tracking system including one or more light sources 922, camera 924, and a controller 980. The one or more light sources 922 emit light onto the eye of the user 25 that reflects as a light pattern (e.g., a circle of glints) that can be detected by the camera 924. Based on the light pattern, the controller 980 can determine an eye tracking characteristic of the user 25. For example, the controller 980 can determine a gaze direction and/or a blinking state (eyes open or eyes closed) of the user 25. As another example, the controller 980 can determine a pupil center, a pupil size, or a point of regard. Thus, in various implementations, the light is emitted by the one or more light sources 922, reflects off the eye of the user 25, and is detected by the camera 924. In various implementations, the light from the eye of the user 25 is reflected off a hot mirror or passed through an eyepiece before reaching the camera 924.

The housing 901 also houses an audio system that includes one or more audio source(s) 926 that the controller 980 can utilize for providing audio to the user ears 60 via sound waves 14 per the techniques described herein. For example, audio source(s) 926 can provide sound for both background sound and the feedback mechanism that can be presented spatially in a 3D coordinate system. The audio source(s) 926 can include a speaker, a connection to an external speaker system such as headphones, or an external speaker connected via a wireless connection.

The display 910 emits light in a first wavelength range and the one or more light sources 922 emit light in a second wavelength range. Similarly, the camera 924 detects light in the second wavelength range. In various implementations, the first wavelength range is a visible wavelength range (e.g., a wavelength range within the visible spectrum of approximately 410-700 nm) and the second wavelength range is a near-infrared wavelength range (e.g., a wavelength range within the near-infrared spectrum of approximately 700-1410 nm).

In various implementations, eye tracking (or, in particular, a determined gaze direction) is used to enable user interaction (e.g., the user 25 selects an option on the display 910 by looking at it), provide foveated rendering (e.g., present a higher resolution in an area of the display 910 the user 25 is looking at and a lower resolution elsewhere on the display 910), or correct distortions (e.g., for images to be provided on the display 910).

In various implementations, the one or more light sources 922 emit light towards the eye of the user 25 which reflects in the form of a plurality of glints.

In various implementations, the camera 924 is a frame/shutter-based camera that, at a particular point in time or multiple points in time at a frame rate, generates an image of the eye of the user 25. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 924 is an event camera including a plurality of light sensors (e.g., a matrix of light sensors) at a plurality of respective locations that, in response to a particular light sensor detecting a change in intensity of light, generates an event message indicating a particular location of the particular light sensor.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of physiological data to improve a user's experience of an electronic device with respect to interacting with electronic content. The present disclosure contemplates that in some instances, this gathered data may include personal information data that uniquely identifies a specific person or can be used to identify interests, traits, or tendencies of a specific person. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve interaction and control capabilities of an electronic device. Accordingly, use of such personal information data enables calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access his or her stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a device comprising a processor:
   obtaining physiological data associated with a pupil during presentation of an interaction element, the interaction element comprising a first region and a second region, each region having different illumination characteristics;
   determining, based on the obtained physiological data, a pupillary response during the presentation of the interaction element;
   determining that the pupillary response corresponds to attention response characteristics associated with attention to the first region of the interaction element based on the different illumination characteristics between the first region and the second region; and
   determining an interaction event during the presentation of the interaction element based on determining that the pupillary response corresponds to directing attention to the first region during the presentation of the interaction element.

2. The method of claim 1, wherein the different illumination characteristics of each region of the interaction element comprises one or more dark regions and one or more bright regions.

3. The method of claim 1, wherein each region of the interaction element comprises a level of luminance and the different illumination characteristics of each region are based on the level of luminance of each region with respect to an illuminance threshold level.

4. The method of claim 1, wherein the presentation of the interaction element comprises pixel information for a plurality of pixels and determining that the pupillary response corresponds to directing attention to the first region of the interaction element comprises:
   determining an estimated perceived luminance for each pixel in the first region based on the pixel information.

5. The method of claim 4, wherein determining an interaction event comprises:
   determining scene-induced pupil response variation characteristics for the regions of the interaction element; and
   determining the interaction event during the presentation of the interaction element based on the scene-induced pupil response variation characteristics for each region of the interaction element.

6. The method of claim 1, wherein the interaction event is classified using a machine learning technique based on the pupillary response and the different illumination characteristics of each region.

7. The method of claim 1, further comprising:
   adjusting content in response to determining the interaction event.

8. The method of claim 1, wherein the pupillary response is:
   a direction of the pupillary response;
   a velocity of the pupillary response; or
   pupillary fixations.

9. The method of claim 1, wherein the pupillary response is derived from a saccade characteristic.

10. The method of claim 1, wherein the physiological data comprises an image of an eye or electrooculography (EOG) data.

11. The method of claim 1, wherein the physiological data comprises head movements.

12. The method of claim 1, wherein determining the pupillary response during the presentation of the interaction element is based on determining a variability of the pupillary response to a threshold.

13. The method of claim 1, wherein the device is a head-mounted device (HMD).

14. The method of claim 1, wherein the presentation of the interaction element is an extended reality (XR) experience.

15. A device comprising:
   a non-transitory computer-readable storage medium; and
   one or more processors coupled to the non-transitory computer-readable storage medium, wherein the non-transitory computer-readable storage medium comprises program instructions that, when executed on the one or more processors, cause the one or more processors to perform operations comprising:
   obtaining physiological data associated with a pupil during presentation of an interaction element, the interaction element comprising a first region and a second region, each region having different illumination characteristics;
   determining, based on the obtained physiological data, a pupillary response during the presentation of the interaction element;
   determining that the pupillary response corresponds to attention response characteristics associated with attention to the first region of the interaction element based on the different illumination characteristics between the first region and the second region; and
   determining an interaction event during the presentation of the interaction element based on determining that the pupillary response corresponds to directing attention to the first region during the presentation of the interaction element.

16. The device of claim 15, wherein the different illumination characteristics of each region of the interaction element comprises one or more dark regions and one or more bright regions.

17. The device of claim 15, wherein each region of the interaction element comprises a level of luminance and the different illumination characteristics of each region are based on the level of luminance of each region with respect to an illuminance threshold level.

18. The device of claim 15, wherein the presentation of the interaction element comprises pixel information for a plurality of pixels and determining that the pupillary response corresponds to directing attention to the first region of the interaction element comprises:
   determining an estimated perceived luminance for each pixel in the first region based on the pixel information.

19. The device of claim 18, wherein determining an interaction event comprises:
   determining scene-induced pupil response variation characteristics for the regions of the interaction element; and
   determining the interaction event during the presentation of the interaction element based on the scene-induced pupil response variation characteristics for each region of the interaction element.

20. A non-transitory computer-readable storage medium, storing program instructions executable by one or more processors on a device to perform operations comprising:
   obtaining physiological data associated with a pupil during presentation of an interaction element, the interaction element comprising a first region and a second region, each region having different illumination characteristics;
   determining, based on the obtained physiological data, a pupillary response during the presentation of the interaction element;
   determining that the pupillary response corresponds to attention response characteristics associated with attention to the first region of the interaction element based on the different illumination characteristics between the first region and the second region; and
   determining an interaction event during the presentation of the interaction element based on determining that the pupillary response corresponds to directing attention to the first region during the presentation of the interaction element.

* * * * *